…

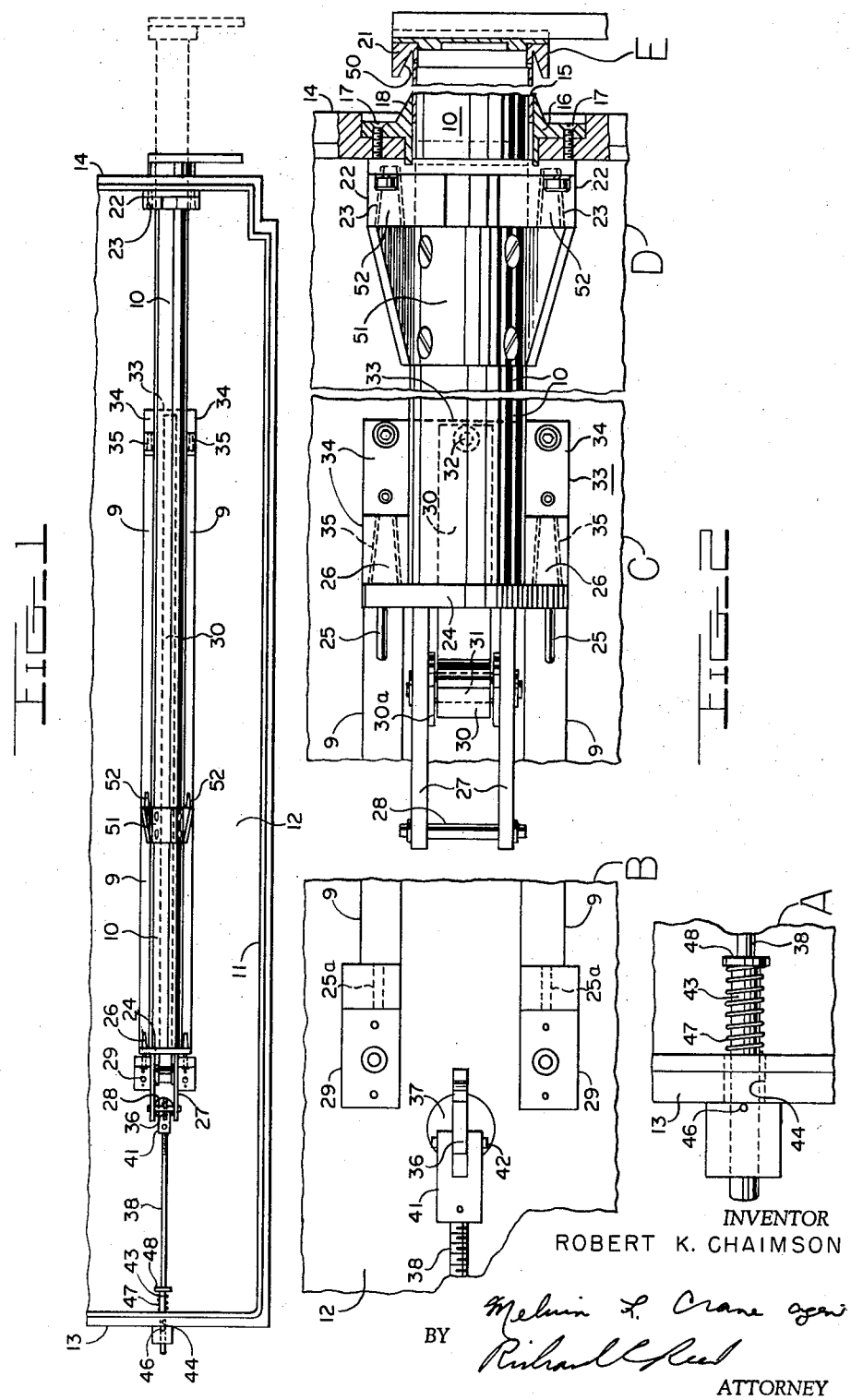

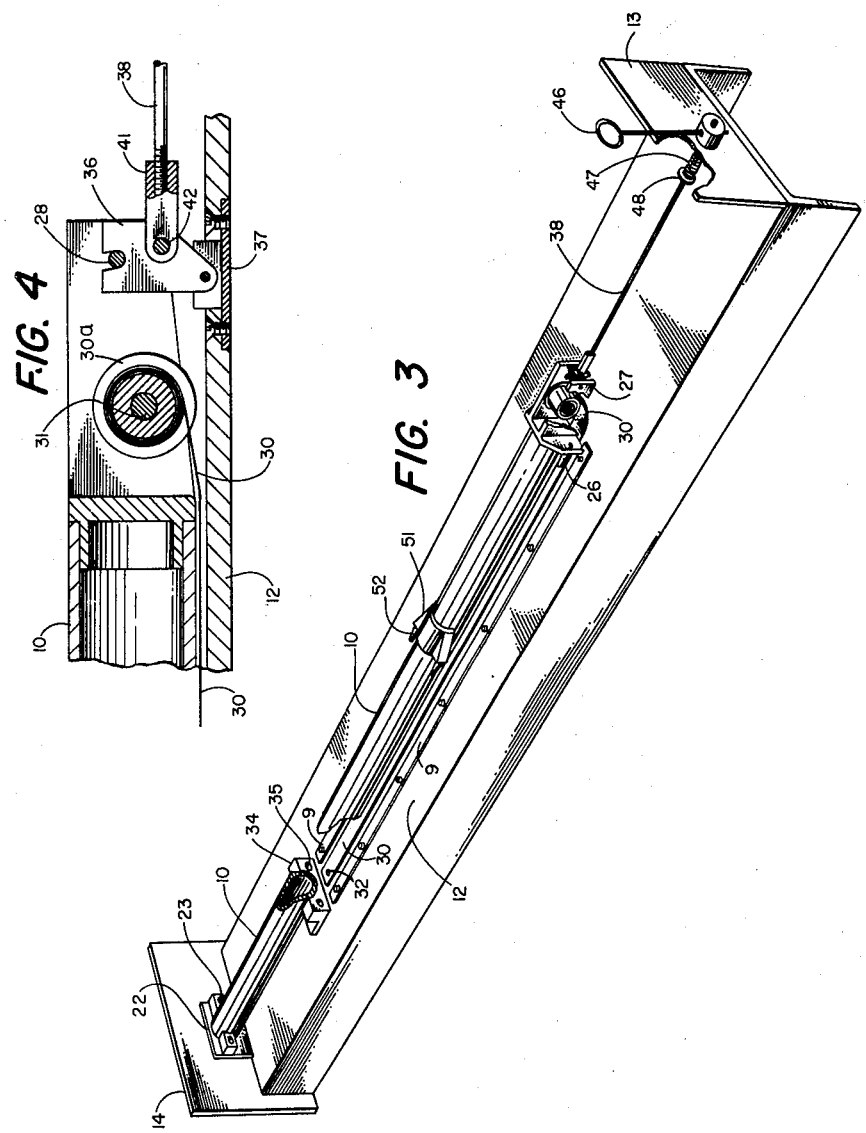

United States Patent Office 3,144,775
Patented Aug. 18, 1964

3,144,775
ARM HOLDING AND EXTENDING MEANS
Robert K. Chaimson, Cheverly, Md., assignor to the United States of America as represented by the Secretary of the Navy
Filed Apr. 17, 1962, Ser. No. 188,287
3 Claims. (Cl. 74—2)
(Granted under Title 35, U.S. Code (1952), sec. 266)

The invention described herein may be manufactured and used by or for the Government of the United States of America for governmental purposes without the payment of any royalties thereon or therefor.

The present invention is directed to an extendable arm and more particularly to a mechanism for extending an arm a specific distance and automatically locking the arm in place.

Under certain circumstances, because of limited space, it is required to provide a mechanism which under more favorable conditions can be extended to a more desirable length to provide an intended result. For example, in carrying out research in the upper atmosphere by use of satellites, there is limited space which prohibits the projection of elements such as antenna from the surface of the satellite during firing of the satellite into orbit. Elements which are required to be extended from the surface of the satellite must, by some means, be extended into position after the satellite has been freed of the nose cone. Various research instruments carried by a research satellite require elements that are extended from the surface of the main body; these elements are contained by the satellite and must be extended by an automatic means or by a command signal to a signal control element carried by the satellite. Other types of elements may have a requirement of containing an element which for certain usage is extended when desired, either remotely or by hand.

It is therefore an object of the present invention to provide a means for extending an element when desired and securing the element in an extended position.

Another object is to provide a simple, light weight means for automatically extending and securing an element in an extended position.

Still another object is to provide a simple means for holding an element in a contained position prior to extension thereof into an extended position.

Other objects and advantages of the invention will hereinafter become more fully apparent from the following description of the annexed drawing, which illustrates the preferred embodiments, and wherein:

FIG. 1 illustrates a top view of the arm extending device in a contained position; and
FIG. 2A, B, C, D and E illustrate more detailed views of the relative parts with sections of the device cut away.
FIG. 3 illustrates a perspective view of the device, and
FIG. 4 illustrates an enlarged view of the arm locking means.

Now referring to the drawings there is shown by illustration an arm 10 adapted to be extended into an extended position along guide rails 9 and accurately secured in the extended position. As shown, the arm is mounted on a support frame, a base, or in a housing 11 which includes a bottom 12 and end supports 13 and 14 formed at 90 degrees to the bottom. The arm extends through an aperture 15 in the end 14 which is provided with a sleeve bearing guide 16 secured therein by screws 17. The bearing guide 16 is provided with an angular sharp edged outer end surface 18 which mates with a ring 21 secured on the arm 10 as shown in FIG. 2, D and E to support the outer end of the arm when it is secured in its contained position in the housing. The ring 21 may support other elements secured thereto which may be required in connection with the extension of the arm. The end 14 has secured on the inner surface blocks 22 which are located on each side of arm 10, each of which has a tapering hole 23 therein in which the taper is toward the center of the hole and toward the end support 14. These holes aid in holding the arm in an extended position which is shown in FIG. 2D and will be explained in greater detail later.

As shown, the inward end of the arm has secured thereto an arm holding and securing means which include a bar 24 at a right angle to the arm which includes directly opposing arm guide pins 25 and arm holding pins 26 which are facing in opposite directions with their longitudinal axis parallel with the axis of the arm 10. The arm guide pins mate with holes in upright stops or blocks 29 positioned at the end of guide rails 9. Guide pins 25 in combination with the mating holes in block 29 and the sharp end 18 on the bearing 16 mating with the ring 21 on the outer end of arm 10 aid in properly securing the arm in its contained position as shown in FIG. 1. Extending from the inward end of the arm and parallel thereto are two spaced bars 27 each of which has secured thereto near the end thereof an arm holding pin 28 held in place by any suitable means. Positioned between the arm holding pin 28 and the bar 24 is a "negator," spring 30, which is used as an energy storing device for moving the arm into an extended position, when the arm is released by its holding means. (A "negator" spring is one which is wound onto a spool 30a and has the characteristics of returning or rewinding onto the spool while applying a constant force throughout its entire length onto a work piece after being pulled out linearly and then released.) The spool is held in place and rotated on a pin or axle 31 with the "free" end of the spring extending along the arm between the arm and the bottom of the housing and secured to the bottom 12 of the housing by a screw 32 located toward the front of the housing. The free end of the spring is secured in a position under the arm such that the arm can be moved into its extended position by the force of the spring. The "free" end of the spring is secured in the vicinity of a U-shaped arm stopping and locking element 33 which is secured to the bottom of the housing at the end of the guide tracks 9 and have sides 34 which extend upwardly on opposite sides of the arm 10 in which the sides 10 contain tapered holes 35 facing toward the rear end of the arm. The tapered holes in the sides 34 are positioned relative to the housing bottom and the arm to receive the tapered arm holding pins 26 secured at the rear end of the arm and facing toward the front of the housing. This combination aids in holding the arm in a locked, extended position.

The arm 10 is held against the force of the "negator" spring in its contained position by the arm holding pin 28 at the inner end thereof wherein the pin is held between the legs of a bifurcated pivotal element 36 when the element 36 is positioned in an upright position with the pin 28 positioned between the legs thereof. The bifurcated element is pivotally secured at the bottom 12 of the base by any suitable means 37 and rounded toward the base such that the bifurcated element will not be restricted in a pivotable movement from an upright position toward the arm for release thereof. The bifurcated element 36 has connected thereto a control rod 38 which has a bifurcated end 41 that fits along the surfaces of the bifurcated arm holding element 36 and pivotably connected thereto by a pin 42. The control rod extends away from the arm parallel to the base and has secured thereto a screw threaded sleeve 43 that passes through an aperture 44 in the support end 13 of the housing. The sleeve has an aperture therein near the outer end through which a holding pin 46 is placed to restrain the rod and bifurcated holding element to hold the arm in place. A spring 47 is secured about the sleeve between the support end 13 and a shoulder, rim, or any other suitable means 48 at the inner end of the sleeve such that the spring is under compression when the arm is held in place by the holding means and pin 46. The spring functions to provide an initial driving boost to the arm when the arm is released by the bifurcated holding means in order to extend the arm.

The arm 10 is provided with an arm locking means 51 secured thereto at a specific position along the length of the arm with tapered pins 52 thereon which mate with the tapered holes 23 in the holding blocks 22 at the support end 14. The tapered pins 52 on the arm locking means 51 and the pins 26 on the cross bar 24 at the inner end of the arm align and mate with tapered holes 23 and 35 respectively to align the arm in proper alignment and to hold the arm in a secured extended position. The tapered pins 52 and 26 are slightly larger than the tapered holes 23 and 35 with the taper of each being the same slope or angle; therefore, the force of the spring in moving the arm into an extended position forces the pins into their respective tapered holes such that the pins are held within the holes by friction between the surfaces of the tapered pins and holes. Thus the arm locking means 51 must be spaced from the cross bar 24 a distance which is equal to the spacing between tapered holes 23 and 35 on locking elements 22 and 33 such that the tapered holes mate with pins 52 and 26 on the arm locking means. The tapered pins and mating tapered holes are secured with respect to each other such that the arm will be in a specific alignment relative to the housing when extended into its extended position. The bar 24 also extends downwardly toward the base between the guide bars or rails 9 in order to guide the arm along the guides and the sleeve bearing 16 acts as a guide at the forward end. The downward force exerted on the arm by the "negator" spring at the inner end of the arm is sufficient to hold the inner end of the arm close to the housing bottom during loading and extension of the arm. It is obvious that arm locking means 51 must pass by locking element 33 therefore the sides 34 of the locking element extend upwardly sufficiently to receive the locking pins 26.

In operation of the device for loading or containing the arm and then releasing the arm for extension thereof, the arm is forced against the force of the "negator" spring into a contained position within the housing and then locked in place by the bifurcated locking means 36 fitting about the pin 28 on the end of the arm. As the arm is forced inwardly and the arm holding pin on the arm contacts the bifurcated holding means, the bifurcated holding means is forced rearward into an upright position about the arm holding pin 28. The coupling end of the rod that is connected to the bifurcated locking means is forced further through the aperture in housing end 13 compressing spring 47 and locked in place by a pin 46 inserted through the aperture in the rod coupling. The pin 46 could be an extension of a rod in a solenoid such that an electrical current through the coil of the solenoid would move the pin from within the hole to release the bar 38 and consequently the arm. As the bifurcated holding means is forced into its arm holding position the arm guide pins 25 are guided into the guide holes in the support blocks 29 adjacent to the locking means and the sharp edge 18 of the sleeve bearing 16 matches with a groove 50 in the ring 21 on the outer end of the arm. The bifurcated holding means restrains the arm against the force of the "negator" spring and prevents the arm from being extended while the guide pins 25 and the sharp edge 18 of the sleeve bearing prevent the arm from movements within the housing due to vibrations, movement, etc. Once the device has been transported or placed in its desired environment for use, the arm can be extended automatically or by hand by removing the rod holding pin 46. When the rod holding pin is removed the compressed boost spring 47 forces the holding means forward and also applies an initial force on the arm through the bifurcated holding means and the arm locking pin. The bifurcated holding means releases the arm holding pin 28, applying an initial moving force to the arm and then the "negator" spring forces the arm outwardly into an extended position. The arm is forced outwardly by the "negator" spring with sufficient force that the locking pins 26 and 52 are forced into the tapered holes 35 and 23 of their respective locking elements and held by friction between the surfaces. The friction forces between the tapered pins and the tapered holes are sufficient to hold the arm in an accurate extended position which requires considerable force to free the arm from the holding tapered holes.

The present invention can be used for many applications which require the containment of an element in a housing or on a base for a period of time and subsequent thereto extending the element from the housing and securing the element in an extended position. Examples of the above can be used in carrying out research in the upper atmosphere where a research mechanism is contained in a satellite package while being boosted into the upper atmosphere and then extended after the satellite has obtained orbit. Such use can also be applied to the extension of antenna on satellites. For such purposes the pin for holding the arm in place can be forced from the aperture in the sleeve on the rod by an electrical explosive means or by some electrical means for withdrawing the holding pin. Any suitable automatic means can be used for releasing the arm.

Obviously many modifications and variations of the present invention are possible in the light of the above teachings. It is therefore to be understood that within the scope of the appended claims the invention may be practiced otherwise than as specifically described.

What is claimed is:

1. A device for holding an arm in a contained position relative to a base and subsequently extending the arm to an extended position which comprises an arm support on said base, guide means for guiding said arm relative to said base, an arm driving means associated with said arm for exerting a constant force thereto in a direction along said guide means to extend said arm into an extended position, arm holding means secured to said base for holding said arm in contained position relative to said base, means for securing said holding means in an arm holding position and subsequently releasing said holding means and said arm, spring means associated with said holding means for applying an initial force to said holding means and said arm upon release of said arm from said holding position, and first and second separate means for holding said arm in an extended position after being released by said holding means and forced into an extended position by said arm driving means.

2. A device for holding an arm in a contained position relative to a base and subsequently extending the arm to an extended position which comprises an arm support on said base, guide rails secured to said base for guiding said arm relative thereto, a "negator" spring driving means connected to said base at one end and to said arm for exerting a force on said arm in a direction along said guide rails relative to said base into an extended position, arm guide means associated with said arm relative to said base, arm holding means pivotably secured to said base for holding said arm in a contained position relative to said base, spring means associated with said holding means for applying an initial force to said holding means and to said arm upon release of said arm from said holding position, means for securing said holding means in an arm holding position and subsequently releasing said arm holding means and said arm, and first and second separate means for holding said arm in an extended position after being released by said holding means and forced into an extended position by said "negator" spring.

3. A device as claimed in claim 2, in which said first and second means for holding said arm in an extended position is formed by matching male and female tapered holding elements with the taper extending in a direction along said arm for accurately aligning said arm in said extended position.

References Cited in the file of this patent

UNITED STATES PATENTS

| | | |
|---|---|---|
| 2,491,629 | Vernier et al. | Dec. 20, 1949 |
| 2,538,885 | Schumann | Jan. 23, 1951 |
| 2,672,304 | Kaufman | Mar. 16, 1954 |
| 2,861,268 | Tinsley | Nov. 18, 1958 |
| 2,895,779 | Bender | July 21, 1959 |

FOREIGN PATENTS

| | | |
|---|---|---|
| 1,040,091 | Germany | Oct. 2, 1958 |